United States Patent Office 3,259,597
Patented July 5, 1966

3,259,597
COMPOSITIONS COMPRISING A VINYL CHLORIDE RESIN, A SOLVENT AND AN ANTI-GELLING AGENT
Charles A. Burger, Clark, N.J., assignor to Carlisle Chemical Works, Inc., Reading, Ohio
No Drawing. Filed July 2, 1963, Ser. No. 292,893
17 Claims. (Cl. 260—23)

This invention relates to a method of reducing or controlling the viscosity and thixotropic characteristics of organic solutions or organosols of vinyl chloride containing resins. The invention relates also to the thus obtained compositions.

It is well known that vinyl chloride containing resins are subject to discoloration when exposed to elevated temperatures, and require the addition of stabilizers to prevent such discoloration.

Organic solutions of vinyl chloride resins used for coatings consist of a wide variety of types. Broadly, they may be defined as a combination of vinyl chloride resins and plasticizers in a mixed solvent system consisting of a solvent proper such as aromatic ketones and a thinner such as aromatic hydrocarbons.

Organosols are combinations of dispersion type vinyl chloride resins and plasticizer dispersed in a mixture of volatile organic liquids consisting of both polar ketones or esters and non-polar hydrocarbon thinners.

The viscosity of such solutions or sols will vary within wide limits but it must not be so high as to interfere with the coating properties of the resin system; it may be said that viscosities in excess of 30,000 cps. prevent the use of systems of the type here considered for coating purposes.

It is also known that some of the most effective stabilizer groups cannot be added to organic solutions or organosols of vinyl chloride polymers because they produce premature and often instantaneous gelation or precipitation. One group of such stabilizers is represented by the salts of metals of the second group of elements of the periodic system, particularly barium, cadmium, zinc, with carboxylic acids; widely used are the metal soaps of aliphatic monocarboxylic acids having 8 to 24 carbon atoms. Examples of other suitable acids are given, for instance in Patent No. 2,889,295.

A second group of such gelation producing stabilizers are the organotin compounds, except the organotin mercapto compounds. Such non-sulfur containing tin compounds are, for instance, the mono, di, and triorgano tin oxides, hydroxides, ethers, esters, and salts of carboxylic acids as well as polymers of such compounds.

I have found that certain polyfunctional aliphatic carboxylic acids prevent gelling of such organic solutions or organosols of vinyl chloride resins under the influence of the stabilizers recited hereinabove and are even able to restore the gelled organosol or organic coating solution to its original viscosity and thixotropic state. Suitable anti-gelling agents are those polyfunctional acids in which one functional group is the carboxyl group and at least one other functional group is a carbon atom to which either halogen or an element of the sixth group of the periodic system, preferably O or S, is bound.

Suitable acids are, for instance, lower aliphatic carboxylic acids of the formula

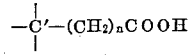

wherein C' may be substituted with one or more halogen atoms (in which case $n=0$), or C' may be singly or multiply bonded to O, S, or Se in which case $n=0$ or an integer, preferably not more than 2). The valences of C' not taken up by halogen or a group VI element are bound to hydrogen or alkyl.

Such acids are:

(a) Hydroxy acids, such as hydroxy acetic acid, lactic acid, beta-hydroxy propionic acid, gamma-hydroxy butyric acid and dimethylol propionic acid;

(b) Keto acids, such as pyruvic acid;

(c) Halogen-substituted acids, such as the three chloroacetic acids and alpha-bromo-lauric acid.

(d) Mercapto acids, such as mercaptopropionic and thioglycolic acids.

In homologous series, the relative viscosity reducing effect of the additive was found proportional to the dissociation constant of the acid. It is interesting to note that some of said acids, when used without the recited stabilizers, have quite different effects. Some may act as antioxidants in molding powders, others have been used to coagulate suspended colloidal material from resin solutions, that is for exactly the opposite purpose as that of my invention.

In addition, I have found that 1,3-diketones and alkyl mercaptans, separately, are sufficient to inhibit gelation in those organic solutions and organosols to which non-sulfur containing organotin compounds have been added in lieu of carboxylate salts of the Group II element of the periodic table, as well as the carboxylic acids described above.

A reasonable hypothesis for the explanation of the specific effect of the recited acids in off-setting the gelling effect of certain metallic stabilizers may be the following:

The gelation caused by said stabilizers may be the product of an intermolecular chain association through the vacant orbitals of the bivalent metals, which have a tetra coordinate aptitude, or through the vacant orbitals of organotin compounds, which have hexacoordinate aptitude. This association may be represented as follows:

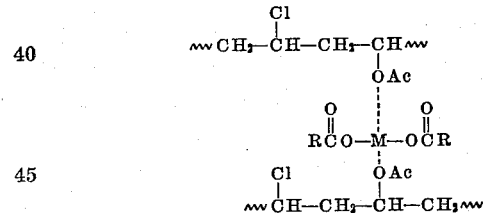

On addition of a bifunctional or poly functional acidic compound, the orbital requirements of the metal are intramolecularly satisfied by ligand displacement and coordination to

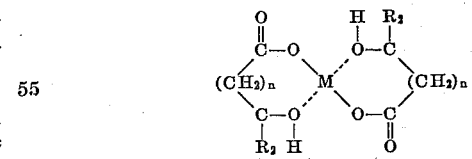

where:
$n=0$ to 2;
R=H or alkyl and
M is either a Group II element or dialkyl tin As a result, the chain-forming and thus gelling effect of the metal of the stabilizer is blocked.

For the ligand displacement in organotin compounds, even less acidic compounds are sufficient which explains why not only the polyfunctional acids recited above but also alkyl mercaptans having 8 to 18 carbon atoms such as dodecyl or tridecyl mercaptan, and 1,3-diketones such as acetyl acetone, benzoyl acetone, dibenzoyl methane, are able to counteract the gelling effect of organotin stabilizers. Simple mercaptans probably function through the ability of sulfur to expand its octet to accommodate vacant tin orbitals, while 1,3-diketones function by chelate formation, viz,

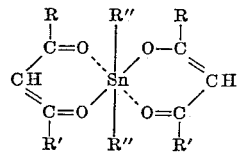

where R and R' may be the same or different groups and may be either a lower alkyl such as methyl or ethyl, or an aryl group, and R'' is a monovalent hydrocarbon, preferably an alkyl group.

The metal stabilizer and the anti-gelling agent may be added together or separately to the organosol. The anti-gelling agent may be added as such or dissolved in a suitable solvent. The anti-gelling agent may be added after gelation also, and achieves the same viscosity reducing effect.

The following examples illustrate the invention.

*Example 1*

An organosol was prepared according to the following formulation:

| Component: | Parts by weight |
|---|---|
| Homopolymer, poly(vinyl chloride) | 9.05 |
| Terpolymer, 13% poly(vinyl acetate), 86% poly(vinyl chloride), 1% maleic anhydride | 9.05 |
| Epoxy resin (diglycidyl ether of bisphenol-A) | 0.54 |
| Titanium dioxide-rutile, non-chalking | 16.3 |
| Antimony oxide | 1.80 |
| Dioctyl phthalate | 5.43 |
| Diisobutyl ketone | 14.46 |
| Methyl isobutyl ketone | 8.14 |
| High flash aromatic naphtha | 34.69 |
| Nuodex NA | 0.16 |

"Nuodex NA" is a product used for dispersing pigments in vinyl resins and is described as dibutyl-di-(triethanolamine)-silicate-N,N-dioleate.

The pigment, plasticizer and 10% of the resin were dispersed in a pebble mill for 17 hours with enough solvent to give 60% non-volatile. The remaining resin was dissolved separately in the solvent. This resin solution was added to the dispersion and mixed thoroughly. The viscosity measured at room temperature with a model LVF Brookfield viscosimeter, was 6200 centipoises.

To this organosol, 0.36 part by weight of a barium-cadmium-zinc octoate para-t-butyl benzoate stabilizer (6.0% Ba; 3.0% Cd; 0.5% Zn) were added which produced gelation immediately. The viscosty of the stabilized gelled organosol was above 30,000 centipoises.

The following Table I gives the amounts of anti-gelling agents required to restore batches of 200 g. of the stabilized formulation to the original viscosity.

TABLE I

| Anti-gelling agent: | Grams |
|---|---|
| Lactic acid | 0.2 |
| Pyruvic acid | 0.3 |
| Citric acid | 0.62 |
| Hydroxy acetic acid | 0.5 |
| Beta-hydroxy propionic acid | 0.35 |
| Gamma-hydroxy butyric acid | 1.75 |
| Chloroacetic acid | 0.6 |
| Dichloroacetic acid | 0.4 |
| Trichloroacetic acid | 0.35 |
| Tartaric acid | 0.72 |
| Mercapto propionic acid | 5.1 |
| Dimethylol propionic acid | 0.7 |

The following table shows the molar amounts of some acids required to restore 200 grams of the formulation to a viscosity of 9000 centipoises.

TABLE II

| Acid | $10^4$ M | log $10^4$ M | $pK_a(H_2O)$ | $pK_a(\phi H)$ |
|---|---|---|---|---|
| Lactic | 8 | — | 3.86 | — |
| Glycollic | 17 | — | 3.82 | — |
| Chloroacetic | 37.8 | 1.58 | 2.86 | 2.90 |
| Trichloroacetic | 9.5 | 0.98 | 0.89 | 0.70 |
| Dichloroacetic | 24.0 | 1.38 | 1.30 | 1.75 |

*Example 2*

The same formulation was used as in Example 1 but as stabilizer 0.36 part by weight of dibutyl tin dilaurate were employed. The thus gelled organosol had a viscosity in excess of 30,000 centipoises.

The following table corresponds to Table I.

TABLE III

| Anti-gelling agent: | Grams |
|---|---|
| Lactic acid | 0.4 |
| Pyruvic acid | 0.2 |
| Citric acid | 0.3 |
| Hydroxy acetic acid | 0.65 |
| Beta-hydroxy propionic acid | 0.65 |
| Gamma-hydroxy butyric acid | 0.30 |
| Chloroacetic acid | 0.4 |
| Dichloroacetic acid | 0.34 |
| Trichloroacetic acid | 0.35 |
| Alpha-bromolauric acid | 0.4 |
| Mercapto propionic acid | 0.2 |
| Acetyl acetone | 4.0 |
| Tartaric acid | 0.46 |
| Dodecyl mercaptan | 0.9 |
| Dimethylol propionic acid | 0.2 |

1.5 mils coatings of the organosols of Tables I and III were applied to aluminum strips which were then cured at 177° C. for 20 minutes. In no case, adverse effects on the heat stabilizing properties of the stabilizers were observed.

In contradistinction to the favorable effects of the re-cited additives, tests made with benzoic acid, salicyclic acid, or amino acids proved to be completely negative for obviating the gelling properties of the stabilizers.

The described tests were made with organosols of polyvinyl chloride copolymers. Instead of, or in addition to, the vinyl acetate and maleic anhydride there employed, organosols may be employed in which vinyl chloride is copolymerized with other unsaturated compounds such as vinylidene chloride, acrylates, and methacrylates. Similar results are obtained with organic solutions of polymers of vinyl chloride with one or more ethylenically unsaturated monomers such as vinyl acetate, vinylidene chloride, maleic anhydride, acrylates, methacrylates, and the like wherein vinyl chloride constitutes at least 60 percent by weight of the resin.

*Example 3*

An organic solution was prepared according to the following formulation.

| Component: | Parts by weight |
|---|---|
| Terpolymer, 13% poly(vinyl acetate), 86% poly(vinyl chloride), 1% maleic anhydride | 12.00 |
| Copolymer, 87% poly(vinyl chloride), 13% poly(vinyl acetate) | 5.10 |
| Epoxy resin—Diglycidyl ether of "bis phenol A" | 0.50 |
| Titanium dioxide—rutile, non-chalking | 11.50 |
| Antimony oxide | 1.30 |
| Methyl isobutyl ketone | 32.61 |
| Toluene | 33.25 |
| Tricresyl phosphate | 3.40 |

The viscosity of this solution was 485 centipoises. Upon addition of 0.36 part by weight of the barium-cadmium-zinc salt stabilizer of Example 1, viscosity increased to 1700 centipoises. The original low viscosity was restored by adding 0.6 gram of hydroxyacetic acid to 200 grams of the stabilized material.

*Example 4*

An organic solution was prepared and stabilized according to Example 3. Upon adding 0.85 gram of thioglycolic acid to 200 grams of the 1700 centipoises organic solution, the viscosity dropped to 470 centipoises.

*Example 5*

An organic solution was prepared according to Example 3. To this was added 0.35 part by weight of dibutyl tin dilaurate, and a rapid viscosity increase was noticed. After addition of 0.35 gram of hydroxy acetic acid to 200 grams of this thickened material, the viscosity dropped to 480 centipoises.

I claim:

1. A method of inhibiting gel formation in the stabilization with metallic stabilizers of organic solutions and organosols of vinyl chloride containing resins comprising adding to the resin an anti-gelling agent selected from the group consisting of polyfunctional aliphatic monocarboxylic acids wherein at least one functional group has a Group VIA element bound to a carbon atom adjacent to the carboxylic acid group and polyfunctional aliphatic monocarboxylic acids wherein at least one halogen atom is bound to a carbon atom adjacent to the carboxylic acid group, in an amount ranging from about 0.3 times the weight of said stabilizer up to 10% of the agent based on the weight of the resin.

2. The method as claimed in claim 1 wherein said stabilizer is a salt of a metal of the second group of the periodic system of elements with a carboxylic acid.

3. The method as claimed in claim 1 wherein said anti-gelling agent is added to the resin prior to the addition of the stabilizer.

4. The method as claimed in claim 1 wherein said anti-gelling agent is added to the resin together with the stabilizer.

5. The method as claimed in claim 1 wherein said anti-gelling agent is added to the resin system after addition of the stabilizer.

6. A method of inhibiting gel formation in the stabilization with organometallic stabilizers of organic solutions and organosols of vinyl chloride containing resins comprising the addition to the resin of an anti-gelling agent selected from the group consisting of polyfunctional aliphatic monocarboxylic acids wherein at least one functional group has a Group VIA element bound to a carbon atom adjacent to the carboxylic acid group and polyfunctional aliphatic monocarboxylic acids wherein at least one halogen atom is bound to a carbon atom adjacent to the carboxylic acid group, in an amount ranging from about 0.3 times the weight of the said stabilizer up to 10% of the agent based on the weight of the resin.

7. The method as claimed in claim 6 wherein said stabilizer is a sulfur-free organotin compound.

8. A method of inhibiting gel formation in the stabilization with organometallic stabilizers of organic solutions and organosols of vinyl chloride containing resins comprising the addition to the resin of an anti-gelling agent selected from the group consisting of alkyl mercaptans and 1,3-diketones, in an amount ranging from about 0.3 times the weight of said stabilizer up to 10% of the agent based on the weight of the resin.

9. The method as claimed in claim 8 wherein said stabilizer is a sulfur-free organotin compound.

10. A liquid resin composition stabilized against heat and gelling comprising a solvent, a vinyl chloride containing resin, a sulfur-free organotin compound as heat stabilizer selected from the group consisting of organotin esters of organic carboxylic acids, organotin alkoxides, organotin oxides and organotin hydroxides, in an amount of 0.2 to 5 percent, calculated on the resin, and as anti-gelling agent a member of the group consisting of 1,3-diketones, alkyl mercaptans, polyfunctional aliphatic monocarboxylic acids wherein at least one functional group has a Group VIA element bound to a carbon atom adjacent to the carboxylic acid group and polyfunctional aliphatic monocarboxylic acids wherein at least one halogen atom is bound to a carbon atom adjacent to the carboxylic acid group, said anti-gelling agent being present in an amount ranging from about 0.3 time the weight of the stabilizer up to 10% of the agent based on the weight of resin.

11. The composition as claimed in claim 10 wherein the anti-gelling agent is acetylacetone.

12. The composition as claimed in claim 10 wherein the anti-gelling agent is dodecyl mercaptan.

13. A liquid resin composition stabilized against heat and gelling comprising a solvent, a vinyl chloride containing resin, as heat stabilizer a salt of a metal of the second group of the periodic system of elements with an aliphatic carboxylic acid having 8 to 24 carbon atoms, in an amount of 0.2 to 5 percent, calculated on the resin, and as anti-gelling agent a member of the group consisting of polyfunctional aliphatic monocarboxylic acids wherein at least one functional group has a Group VIA element bound to a carbon atom adjacent to the carboxylic acid group and polyfunctional aliphatic monocarboxyl acids wherein at least one halogen atom is bound to a carbon atom adjacent to the carboxylic acid group, said anti-gelling agent being present in an amount ranging from about 0.3 times the weight of the stabilizer up to 10% of the agent based on the weight of the resin.

14. The composition as claimed in claim 13, wherein the anti-gelling agent is a member of the group consisting of lactic acid, hydroxy acetic acid, pyruvic acid, dimethylol propionic acid, beta-hydroxy propionic acid, gamma-hydroxy butyric acid, chloroacetic acid, dichloroacetic acid, and trichloroacetic acid.

15. The composition as claimed in claim 13 wherein the resin is polyvinyl chloride.

16. The composition as claimed in claim 13 wherein the resin is a conjoint polymer of vinyl chloride with another polymerizable compound.

17. The composition as claimed in claim 13 wherein the solvent is at least one member of the group consisting of ketones of the formula RCOR′ wherein R and R′ are alkyl groups having 1 to 4 carbon atoms, toluene and xylene.

References Cited by the Examiner

UNITED STATES PATENTS

| | | | |
|---|---|---|---|
| 2,431,078 | 11/1947 | Powell et al. | 260—31.8 |
| 2,548,433 | 4/1951 | Klein et al. | 260—29.1 |
| 3,153,638 | 10/1964 | Tarwild | 260—32.8 |

LEON J. BERCOVITZ, *Primary Examiner.*

R. A. WHITE, *Assistant Examiner.*